Patented Nov. 15, 1938

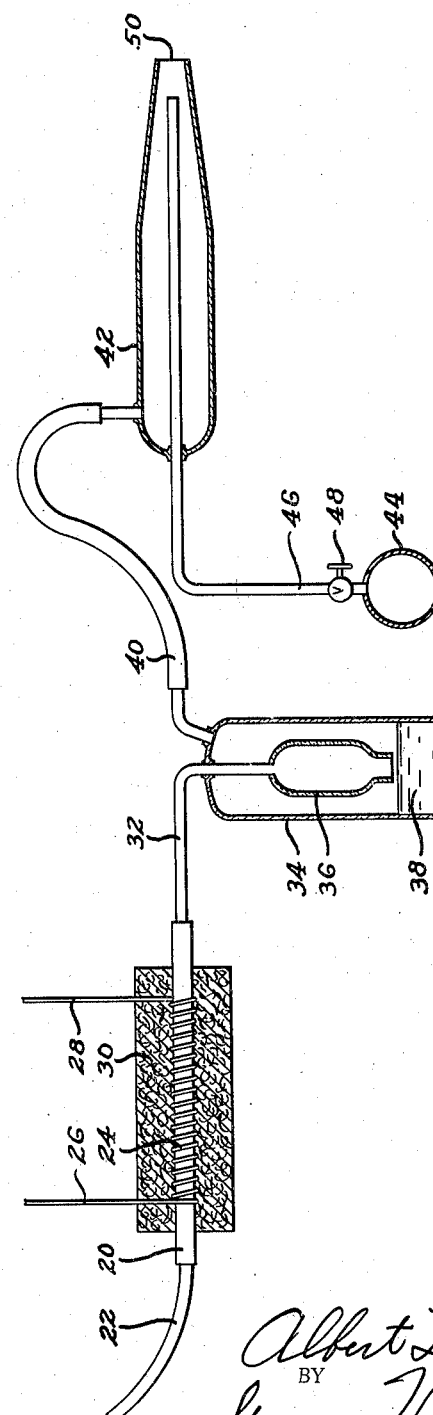

2,136,741

UNITED STATES PATENT OFFICE 2,136,741

HALIDE DETECTOR

Albert L. Henne, Columbus, Ohio, assignor to General Motors Corporation, Dayton, Ohio, a corporation of Delaware Application February 9, 1935, Serial No. 5,794

7 Claims. (Cl. 23—232)

This invention relates to chemistry and more particularly to methods of and apparatus for the detection and quantitative analysis of halides and halide derivatives, especially those used as refrigerants in refrigerating systems.

Heretofore halides have been detected by the so-called flame test which depends upon the partial decomposition of the halide and the formation of a volatile metallic halide which colors the flame. While this flame test is thoroughly satisfactory for many purposes and has been used to a considerable extent for detecting leaks in refrigerating systems containing the halides such as methyl chloride or dichloro difluoro methane, such a method of testing for leaks has a number of objectionable features. In the first place, refrigerator service men are ordinarily not familiar with chemistry and are not used to detecting slight changes in the color of a flame to detect the leakage of refrigerant. Also as is well known some persons are troubled with color blindness and, of course, therefore have greater difficulty in noting the characteristic color of the flame indicating a halide. Another objection is that in a flame of this type only a very small portion of the halide is decomposed and this tends to make the device not sufficiently sensitive to detect small leaks. Furthermore, in using the flame tests there appears to be a considerable lag in the changing of the color of the flame since the color of the flame is not changed immediately upon coming into contact with the halide and does not immediately return to normal after the halide is no longer present. This hampers the detection of leaks since it makes it necessary to go very slowly in examining the various parts of the refrigerating system for leaks. In addition, such a test is different than most service men are accustomed to since ordinarily the only test they know is the familiar ammonia test for sulphur dioxide which forms a white cloud.

It is an object of my invention to provide an improved method and apparatus for determining the presence of halides and halide derivatives, particularly those used as refrigerants which give a ready and accurate indication of a leak which can be easily understood by any refrigerator service man having no knowledge of chemistry.

It is another object of my invention to provide an improved method of and apparatus for determining the presence of halides and halide derivatives which will immediately react to indicate the presence of the halides and halide derivatives and which will immediately cease the indication of halides and halide derivatives when such halide and halide derivatives are no longer present.

In the manufacture of halides and halide derivatives, particularly those of the halo fluoro compounds used as refrigerants, it is necessary to determine the proportion of the different elements of the halide family in the compound in order to determine its purity.

It is another object of my invention to provide an improved method of and apparatus for determining the amount of different individual halides in a compound and particularly one which may be used in connection with my improved method of and apparatus for detecting halides.

Further objects and advantages of the present invention will be apparent from the following description, reference being had to the accompanying drawing wherein a preferred form of the present invention is clearly shown.

In the drawing:

The figure is a view partly in section and partly diagrammatic disclosing an apparatus for carrying out my improved method for detecting the presence of halides and halide derivatives and to determine the amount of each of the halides present in a given quantity of fluid to be tested.

Generically, my improved process involves the passing of the material or fluid to be tested into contact with a hot material which will react to combine with the halides present to form a product which by contacting it with a second medium gives an indication which is not dependent upon slight changes in color but which may be readily seen as a white cloud and be understood by a refrigerator service man inexperienced in chemistry.

As one specific example I pass difluoro dichloro methane through a tube of silica about ½" in diameter which is heated electrically to approximately 800° C. In the presence of this heated silica the difluoro dichloro methane breaks down completely forming among other derivatives chlorine and silicon tetra-fluoride ($ClF_4$ and $SiF_4$). All of these compounds or fragments formed are volatile and I pass these volatile compounds or fragments over into a wet atmosphere. In contact with the moisture of the wet atmosphere the silicon tetra-fluoride hydrolyzes and forms silica and hydrofluoric acid. The silica is in the form of a fine dust making a white cloud visible in small quantities. This provides a very sensitive and quick acting leak test for halide refrigerants in a refrigerating system which is very similar in its appearance to the familiar white fumes of ammonia test for sulphur dioxide known by all refrigerator service men.

The silica used in the process may be in the form of porcelain, glass, chinaware, bricks, sand, or pure silica. It may be heated by an electric resistance, a flame or any other suitable means. As alternative materials, any materials containing silicon or boron may be used. Instead of merely passing the decomposition products into a wet atmosphere these decomposition products may instead be passed into the presence of ammonia vapor. When the process is so carried out, that is by passing a halide first into contact with silica heated to approximately 800° C. and then passing the resultant decomposition products into the presence of ammonia vapor, ammonia halide compounds are formed which are visible in the form of a white cloud. When using the process including the ammonia vapor not only compounds containing fluorine and chlorine may be detected but also compounds containing bromine and iodine. When a fluoro chloro derivative such as difluoro dichloro methane is tested by the process including the ammonia vapor, the hydrofluoric and hydrochloric acid formed by hydrolysis of the decomposition products in the presence of the ammonia vapor forms two molecules of ammonium chloride, two molecules of ammonium fluoride and one molecule of silica, all of which produce white powders and appear as white clouds.

Instead of difluoro dichloro methane, other halide refrigerants such as tetra-fluoro dichloro ethane, methyl and ethyl chloride, methyl bromide, methyl iodide, and in fact almost any halide can be detected by my process.

Although it has been found the best to heat the silica as stated above to approximately 800° C. at which temperature the process works very well, it will also work at temperatures below 800° C. but somewhat less efficiently. It, of course, will also work very well at temperatures above 800° C. However, the higher temperatures are unnecessary in order to secure good results.

Referring now to the drawing for a disclosure of one form of apparatus for carrying out my improved method or process, there is shown a combustion tube 20 about ½″ in diameter preferably of pure silica to which the fluid to be tested is conducted by a tube 22 which connects to one end thereof. The silica combustion tube 20 is surrounded the greater portion of its length by an electric heater 24 formed of electric resistance wire which is spirally wrapped around the outside of the tube and which has two terminals 26 and 28 for connection with a suitable source of supply of electric energy. The electric heater 24 and the silica combustion tube 20 are surrounded by insulating material 30. Within the silica combustion tube 20 the decomposition of the halide or halide derivative takes place. The silica combustion tube 20 is connected at its other end to a tube 32 which extends through the top of a glass container 34 and connects to an inner glass container 36 held suspended over a liquid 38 in the bottom of the container 34. This liquid may be water or preferably aqua ammonia. When the decomposition products containing a halide pass from the silica combustion tube into the container 34 and there contact with ammonia vapor, white clouds appear within the container indicating the presence of a halide. The resulting products are drawn from the container 34 through the tubing 40 which is connected to an aspirator or evacuator 42 which, in this case, is shown as being a jet pump operated by compressed air from the tank 44 which compressed air is conducted through the tubing 46 under the control of the valve 48 to the mouth of the jet 50. This jet pump thus draws a continuous stream of medium to be tested through the apparatus at a relatively rapid rate and thereby any halides drawn to the apparatus are immediately indicated by the presence of white clouds within the container 34.

When it is desired to determine the proportion of each specific halogen in the fluid tested, the products discharged from the jet pump are absorbed in a solution of 10 cc. of 0.1 sodium hydroxide solution and 1 cc. of a 30% solution of hydrogen peroxide. Water is used in the glass container 38. This water and the solution of sodium hydroxide and hydrogen peroxide are then mixed and diluted and filtered to form the solution to be titrated.

The solution to be titrated may be more directly and conveniently obtained by substituting a 12 mm. diameter U-tube in the place of the glass container 38. This U-tube is constricted several times to make nine successive bulbs and has a horizontal branch closely connected to the silica tube. The U-tube contains 10 cc. of 0.1 sodium hydroxide solution and 1 cc. of superoxol for absorbing the products of combustion from the silica combustion tube 20. The contents of the U-tube are washed with 150 cc. of distilled water and then a bumping stone and 1 cc. of superoxol are added and the solution boiled to remove the excess of hydrogen peroxide, thus reducing sodium hypochlorite to sodium chloride. The solution is then filtered to remove silica, cooled, and diluted to 250 cc. to form the solution to be titrated.

For the fluorine titration, a 25 cc. aliquot of the solution to be titrated is taken and 2 drops of phenol red indicator is added. This is neutralized with N nitric acid, finishing with 0.02 N nitric acid. After each addition of acid, the solution is heated to expel carbon dioxide, until the yellow color of the indicator becomes permanent. This neutralization must be done very carefully. Thereafter, the total volume is reduced by evaporization to not over 5 cc. To this is added 2 drops of methyl red indicator and 10 drops of brown creosol green indicator and a green color then develops. This is titrated at 80° with a solution of 7.6206 g. of cerium nitrate hexahydrate in two liters (1 cc. of solution is equal to 5 mg. of fluorine). The color changes from green to purplish red and end point is taken when the maximum strength of purplish red is attained.

The chlorine is titrated by the Volhard method.

In order to determine the chlorine content, the Volhard method is used. To the solution is added sufficient of pure 50% HNO₃ to make the solution acid and about 5 cc. in excess. To the solution, diluted to about 150 cc. is added an excess of N/10 silver nitrate reagent. The precipitate is filtered off and washed free of silver nitrate. The filtrate and washings are combined and titrated with N/10 ammonium or potassium thiocyanate solution.

The filtrate from the precipitated chloride is treated with 5 cc. of a saturated solution of ferric ammonium alum and the excess silver determined by addition of the thiocyanate until a permanent reddish-brown color is produced. Each addition of the reagent will produce a temporary reddish-brown color which immediately fades as long as silver uncombined as thiocyanate remains. The trace of excess produces ferric cyanate, the reddish-brown color of this compound being best seen against a white background. From this titration, the amount of silver nitrate used by the chlorine is ascertained.

In the claims, in describing any material as incandescent I mean any substance which is heated sufficiently or is in such a state as to emit light waves. For example, silica may be considered as incandescent when it assumes a dull red or a bright yellow color.

While the form of embodiment of the present invention as herein disclosed constitutes a preferred form, it is to be understood that other forms might be adopted, all coming within the scope of the claims which follow.

What is claimed is as follows:

1. The process of detecting volatile organic fluoro derivatives in a gaseous medium which comprises passing the gaseous medium to be tested into contact with incandescent silica and thereafter passing the resulting product into contact with ammonia.

2. The process of detecting volatile organic fluoro derivatives in a gaseous medium which comprises passing the gaseous medium to be tested into contact with incandescent silica and thereafter passing the resulting product over but out of direct contact with a liquid bath containing water.

3. The process of detecting volatile organic halide derivatives in a gaseous medium which comprises passing the gaseous medium to be tested into contact with a material containing incandescent silica and thereafter passing the resultant products into a gaseous atmosphere containing water vapor.

4. The process of detecting volatile organic halide derivatives in a gaseous medium which comprises passing the gaseous medium to be tested into contact with an incandescent material containing silicon and thereafter passing the resultant products into a gaseous atmosphere containing ammonia vapor.

5. The process of detecting volatile organic halide derivatives in a gaseous medium which comprises passing the gaseous medium to be tested into contact with an incandescent material containing silicon and thereafter passing the resultant products into a gaseous atmosphere containing water vapor.

6. The process of detecting volatile organic fluoro derivatives in a gaseous medium which comprises passing the gaseous medium to be tested into contact with an incandescent material containing silicon and thereafter passing the resultant products into a gaseous atmosphere containing water vapor.

7. The process of detecting volatile organic chloro derivatives in a gaseous medium which comprises passing the gaseous medium to be tested into contact with an incandescent material containing silicon and thereafter passing the resultant products into a gaseous atmosphere containing water vapor.

ALBERT L. HENNE.